United States Patent

Marbet

[15] 3,665,020

[45] May 23, 1972

[54] PROCESS FOR THE PREPARATION OF CRYSTALLINE VITAMIN D³

[72] Inventor: Roman Marbet, Riehen, Switzerland

[73] Assignee: Hoffman-La Roche Inc., Nutley, N.J.

[22] Filed: Feb. 18, 1970

[21] Appl. No.: 12,459

[30] Foreign Application Priority Data

Feb. 25, 1969 Switzerland ..........................2804/69

[52] U.S. Cl..........................................................260/397.2
[51] Int. Cl......................................................C07c 171/10
[58] Field of Search................................260/397.2, 397.25

[56] References Cited

UNITED STATES PATENTS 3,157,678  11/1964  Rappoldt............................260/397.2

*Primary Examiner*—Elbert L. Roberts
*Attorney*—Samuel L. Welt, Jon S. Saxe, Bernard S. Leon, William H. Epstein and George M. Gould

[57] ABSTRACT

The invention comprises the preparation of crystalline vitamin $D_3$ from a vitamin $D_3$ resin by dissolving a vitamin $D_3$ resin in methyl formate and cooling the resultant solution.

6 Claims, No Drawings

PROCESS FOR THE PREPARATION OF CRYSTALLINE VITAMIN D

BACKGROUND OF THE INVENTION

This invention relates to the preparation of crystalline vitamin $D_3$ from a vitamin $D_3$ resin using methyl formate as a crystallization solvent. The crystalline vitamin $D_3$ produced in accordance with this invention can have a purity as high as about 99 percent.

The synthesis of vitamin $D_3$ or cholecalciferol as it is sometimes referred to, can be effected by irradiating a solution of 7-dehydrocholesterol (provitamin $D_3$). The irradiation product is neither pure nor crystalline vitamin $D_3$. Quite the contrary; the irradiation product is a mixture of previtamin $D_3$, unreacted 7-dehydrocholesterol, other products and vitamin $D_3$. The vitamin $D_3$ in the irradiation product must be, of course, isolated and purified.

Isolation of vitamin $D_3$ in the form of a vitamin $D_3$ resin can initially proceed by, for example, precipitating 7-dehydrocholesterol from the irradiation product using an alcohol such as a lower alkanol e.g. ethanol, methanol and the like—if desired after previous thermal isomerization of the previtamin $D_3$ to vitamin $D_3$. Any remaining previtamin $D_3$ and other products can be further separated from the vitamin $D_3$ mixture by esterifying the vitamin $D_3$ to produce vitamin $D_3$ esters which crystallize readily from the reaction mixture. Suitable esters of the vitamin $D_3$ include, for example, esters of lower alkanoic, benzoic, meta and para-substituted benzoic acids (e.g. butyric, benzoic, p-nitrobenzoic, 3,5-dinitrobenzoic, etc.). Isomerization of the previtamin $D_3$ can, alternatively take place after esterification. Esters of vitamin $D_3$ can be converted to vitamin $D_3$ by saponification using a lower alkanolic alkali metal hydroxide solution (e.g. potassium hydroxide, sodium hydroxide, etc. in methanol) and extracting the resulting saponification mixture with a solvent such as an ether or petroleum ether. Concentration of the extract yields a vitamin $D_3$ resin.

Irrespective of which of the above known procedures are used to isolate vitamin $D_3$ from the reaction mixture, the end product is the same i.e. a vitamin $D_3$ resin. Moreover, it is well known in the art that a vitamin $D_3$ resin requires further processing in order to be converted into a crystalline form and this processing is extremly difficult. See, for example, U.S. Pat. No. 3,334,118.

As used herein, the term vitamin $D_3$ resin comprehends the gum like or resinous vitamin $D_3$ material which can be separated from the above-described saponification mixture.

Heretofore vitamin $D_3$ resin was converted to crystalline vitamin $D_3$ by a procedure having severe limitations, namely, by using acetone or acetone/water as a crystallization solvent. This method was not only undesirable, but also impractical since crystallization would not always occur, or at best, it would proceed very slowly. Not infrequently, crystallization would require several days.

Furthermore, known procedures were unsatisfactory since they encountered the problem of gel formation which would inhibit formation of crystalline vitamin $D_3$.

SUMMARY OF THE INVENTION

Accordingly, the present invention is advantageous in that it provides a process for the production of crystalline vitamin $D_3$ from a vitamin $D_3$ resin.

Another advantage of the present invention is the provision of a process which can produce crystalline vitamin $D_3$ having a purity as high as about 99 percent.

Yet another advantage of the present invention is the provision of a process for preparing crystalline vitamin $D_3$ by dissolving a vitamin $D_3$ resin in methyl formate and cooling the resultant solution, thereby avoiding the difficulties of gel formation.

Still another advantage of the present invention is the provision of a process for the preparation of crystalline vitamin $D_3$ from a vitamin $D_3$ resin using a crystallization solvent in which vitamin $D_3$ resin is soluble, yet which permits vitamin $D_3$ crystallization therefrom.

DETAILED DESCRIPTION OF THE INVENTION

The present invention provides a process for the preparation of crystalline vitamin $D_3$ from a vitamin $D_3$ resin which process comprises dissolving a vitamin $D_3$ resin in methyl formate and cooling the resultant solution.

Preferably, the crystallization process is carried out in an atmosphere inert to vitamin $D_3$ (e.g. nitrogen, argon, etc.) to prevent deterioration of this substance, using methyl formate having an initial temperature of above about 20°C. Suitable quantities for dissolving the vitamin $D_3$ resin are, for example, from 5- to 20-fold amounts of methyl formate.

Vitamin $D_3$ begins to crystallize out of the methyl formate/vitamin $D_3$ resin solution at about 5°–15°C. Crystallization can, if desired, be accelerated by seeding the resultant solution with a few vitamin $D_3$ crystals.

In accordance with custom and usage in the art, the term seeding, as used herein, comprehends the introduction of a crystal(s) as a seed or nucleus for crystallization. Likewise, cooling comprehends an act of bringing the resultant solution of vitamin $D_3$ resin and methyl formate to a temperature level to permit crystallization of vitamin $D_3$. For example, this can be effected by dissolving a vitamin $D_3$ resin in a solution of methyl formate having an initial temperature of above about 20°C and cooling the solution thereafter to a temperature which is preferably from about −20°C to about 15°C.

It has been discovered that methyl formate is particularly well suited as a solvent useful in the crystallization of vitamin $D_3$ in that it has a low boiling point (about 32°C) thereby facilitating rapid removal from the formed crystals of vitamin $D_3$. Moreover, methyl formate evidences surprisingly favorable solubility properties for the crystallization of vitamin $D_3$ from a vitamin $D_3$ resin inasmuch as a vitamin $D_3$ resin dissolves readily in methyl formate at temperatures about 20°C, but is only slightly soluble at temperatures below 10°C. This advantage is particularly evident in comparison with the related compounds of ethyl formate, methyl acetate and ethyl acetate.

The following examples are given in further illustration of the invention.

EXAMPLE 1

PREPARATION OF VITAMIN $D_3$ RESIN 80 g of vitamin $D_3$ 3,5-dinitrobenzoate (obtained by irradiation of 7-dehydrocholesterol, precipitation of the unreacted 7-dehydrocholesterol from the reaction product with methanol and esterification of the purified reaction product with 3,5-dinitrobenzoyl chloride in pyridine) and 400 ml of petroleum ether (b.p. 30°–45°C) is added to a solution of 40 g of potassium hydroxide in 400 ml methanol. The mixture is stirred under a nitrogen gas atmosphere for 30 minutes at 20°–25°C, treated with 40 ml water and stirred at room temperature for an additional 15 minutes. The resulting solution is neutralized by adding 40 ml glacial acetic acid and to which mixture is added 950 ml water and 500 ml petroleum ether. The lower aqueous layer is separated off in a separatory funnel. The residual layer of petroleum ether is shaken three times each with 300 ml 90 percent methanol and once with 300 ml 9 percent aqueous sodium bicarbonate solution. Evaporation (under vacuum) yielded: vitamin $D_3$ resin (viscous).

EXAMPLE 2

PREPARATION OF CRYSTALLINE VITAMIN $D_3$ 57 g of vitamin $D_3$ resin is dissolved in 570 ml methyl formate under a nitrogen atmosphere at 20°–25°C. The resultant solution is cooled to 12°C and seeded with a few vitamin $D_3$ crystals. The resultant mixture is stirred while being gradually cooled to 0°C. Vitamin $D_3$ crystals separate therefrom as a white crystal mash. The resultant mixture is then allowed to stand overnight (about 12 hours) at −20°C followed by filtration of the formed crystals. Washing the crystal mash with about 300 ml methyl formate cooled to −20°C, and drying at 25°−30C yielded: crystalline vitamin $D_3$. M.P. 83°−84°C, $[\alpha]_D^{25} = 53°$ (CHCl$_3$), $E_1^{1\%}{}_{cm} = 480$ at 262 nm (hexane).

Optional concentration of the mother liquor yielded additional amounts of crystalline vitamin $D_3$. M.P. 83°C, $E_1^{1\%}{}_{cm} = 480$ at 262 nm (hexane).

EXAMPLE 3

PREPARATION OF CRYSTALLINE VITAMIN $D_3$ 10 g of vitamin $D_3$ is dissolved in 100 ml diethyl ether. Evaporation of the solvent on a rotary evaporator yielded a resinous residue which was then dissolved in 100 ml methyl formate. The resultant solution was cooled to 12°C and seeded with vitamin $D_3$ crystals. The mixture was then further cooled to −20°C within 1 hour, allowed to stand at this temperature for 2 hours and the crystals filtered off. Washing the crystals with 120 ml methyl formate cooled to −20°C and vacuum drying at 30°C yielded: crystalline vitamin $D_3$. M.P. 83°C, $E_1^{1\%}{}_{cm} = 480$ at 262 nm (hexane).

I claim:

1. A process for the preparation of crystalline vitamin $D_3$ from a vitamin $D_3$ resin which process comprises dissolving a vitamin $D_3$ resin in methyl formate and cooling the resultant solution.

2. The process of claim 1 wherein the resultant solution is cooled to a temperature of from about −20°C to about 15°C.

3. The process of claim 1 which proceeds in an inert atmosphere.

4. The process of claim 1 which further includes seeding the resultant solution with vitamin $D_3$ crystals.

5. A process for the preparation of crystalline vitamin $D_3$ from a vitamin $D_3$ resin which process comprises dissolving a vitamin $D_3$ resin in methyl formate, cooling the resultant solution and seeding said solution with vitamin $D_3$ crystals.

6. The process of claim 5 wherein the resultant solution is cooled to a temperature of from about −20° to about 15°C.

* * * * *